US005864774A

United States Patent [19]

Jones

[11] Patent Number: 5,864,774

[45] Date of Patent: Jan. 26, 1999

[54] METHOD FOR CALIBRATING POSITION OF A PRINTED IMAGE ON A FINAL RECEIVING SUBSTRATE

[75] Inventor: Michael E. Jones, Portland, Oreg.

[73] Assignee: Tektronix, Inc., Wilsonville, Oreg.

[21] Appl. No.: 918,463

[22] Filed: Aug. 26, 1997

[51] Int. Cl.[6] .................... G06F 15/76

[52] U.S. Cl. .................... 702/94; 702/95; 346/103

[58] Field of Search .................... 364/571.01; 346/108, 346/103; 347/103, 102; 355/55, 57, 53; 702/189, 197, 198, 199, 94, 95

[56] References Cited

U.S. PATENT DOCUMENTS

| | | | |
|---|---|---|---|
| 4,734,868 | 3/1988 | DeLacy | 364/519 |
| 5,127,752 | 7/1992 | Courtney | 400/343 |
| 5,170,416 | 12/1992 | Goetz et al. | 377/17 |
| 5,252,991 | 10/1993 | Storlie et al. | 346/108 |
| 5,502,476 | 3/1996 | Neal et al. | 347/103 |
| 5,619,240 | 4/1997 | Pong et al. | 347/103 |

*Primary Examiner*—Kamini Shah
*Attorney, Agent, or Firm*—Charles F. Moore

[57] ABSTRACT

A method for calibrating a printer or other imaging system to accurately place an image on a final receiving substrate is provided. A test image is printed and the margins between the image and the edges of the media are measured. These measured margin values are then utilized to adjust stored calibration factors that calibrate the printer to accurately place the image on the final receiving substrate.

20 Claims, 4 Drawing Sheets

METHOD FOR CALIBRATING POSITION OF A PRINTED IMAGE ON A FINAL RECEIVING SUBSTRATE

TECHNICAL FIELD

The present invention relates generally to an imaging process, and more particularly to a method for calibrating a printer or other imaging system to accurately position an image on a final receiving substrate.

BACKGROUND OF THE INVENTION

An important function of any printing or imaging system is accurately placing an image in a desired location on the final receiving medium. Many printers and imaging systems utilize mechanical media measurement and/or media position location systems to effect image placement. These systems will typically calculate the width and length of the media, as well as the position of the media relative to the image-generating components of the printer or imaging system.

Many prior art printers are limited to handling two sizes of media, such as A and A4 size media. These printers often incorporate fixed-position media width sensors to detect the size of the media, with one sensor being provided for each size. A common sensor that is utilized is a photo-reflective sensor that detects the presence or absence of a sheet of media at a particular location.

As the number of different sizes of media to be printed increases, the use of a separate fixed-position sensor for each media size becomes less desirable. Additionally, the accuracy of the mechanical subsystems used to determine the media width and media position is subject to fluctuation due to component variations and assembly tolerances in the subsystems. In printers utilizing photo-reflective sensors to detect the edges of a sheet of media, the exact point of detection of the media will vary depending upon the reflectivity of different media types, as well as manufacturing variations from one sensor to another.

The present invention is directed to a method for calibrating a printer to align an image on a final receiving substrate. A test image is printed and the margins between the image and the edges of the media are measured. These measured margin values are then utilized to adjust calibration factors that calibrate the printer to accurately place the image on the final receiving substrate.

SUMMARY OF THE INVENTION

It is an aspect of the present invention to provide an improved method for calibrating image placement by a printer.

It is another aspect of the present invention to provide a method that allows for accurate and repeatable placement of images on a final receiving substrate.

It is another aspect of the present invention to provide a method that utilizes calibration factors that adjust the calculations of a media measurement subsystem to compensate for component tolerances and variations in media types and sizes.

It is a feature of the method of the present invention that the method is a closed loop process.

It is an advantage of the method of the present invention that calibration of the printer enables the printer to print on various media types having different sizes and reflectivities.

To achieve the foregoing and other aspects, features and advantages, and in accordance with the purposes of the present invention as described herein, an improved method for calibrating a printer or imagine apparatus to accurately place an image on a final receiving substrate is provided. The method utilizes calibration factors to correct for media measurement component, imaging component and assembly tolerances. A test image is printed and the margins between the image and the edges of the media are measured. These measured values are then utilized to adjust calibration factors that calibrate placement of the image by the printer.

Still other aspects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive. And now for a brief description of the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
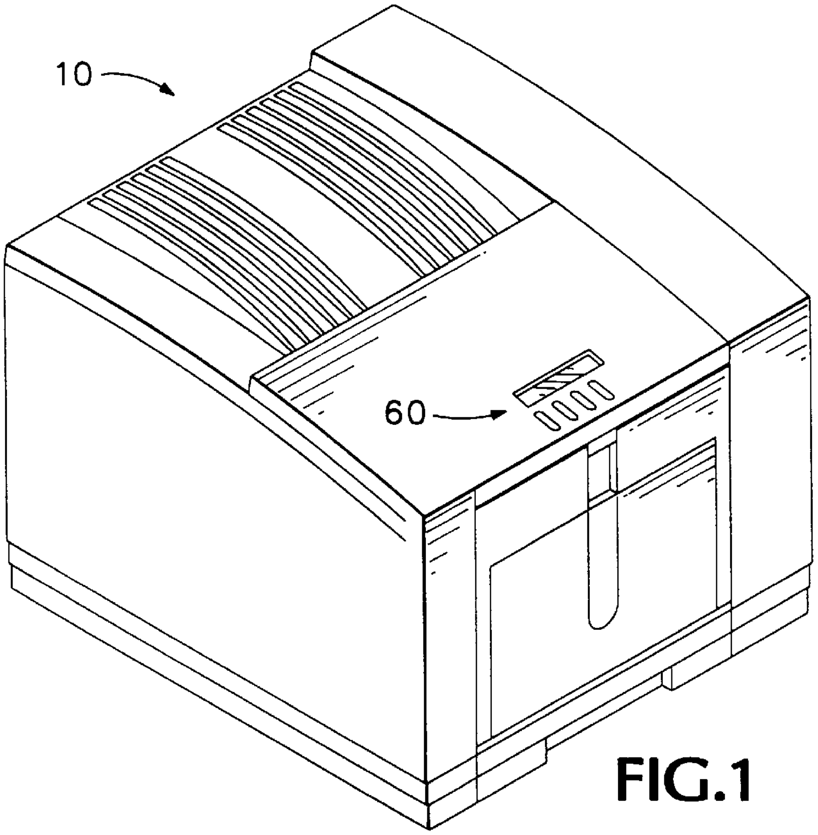
FIG. 1 is an overall perspective view of a transfer ink-jet printer that utilizes the method of the present invention.

FIG. 1 of the drawings show an overall view of a transfer ink-jet color printer, generally represented by the reference numeral 10, with which the method of the present invention may be utilized. An example of a suitable transfer ink jet color printer with which the present invention may be utilized is disclosed in U.S. Pat. No. 5,502,476 (the –476 patent), entitled METHOD AND APPARATUS FOR CONTROLLING A PHASE-CHANGE INK TEMPERATURE DURING A TRANSFER PRINTING PROCESS, and assigned to the assignee of the present application. The –476 patent is hereby specifically incorporated by reference in pertinent part. It will be appreciated, however, that the method of the present invention may be used with various other printing, imaging, and/or copying apparatus and systems that utilize different printing architectures or imaging technologies, such as direct ink-jet printing, dye sublimation, thermal wax transfer and/or electrophotography. Accordingly, the following description will be regarded as merely illustrative of one embodiment of the present invention, and should not be interpreted as in any way limiting the invention to transfer ink-jet color printers.

Figure 2:
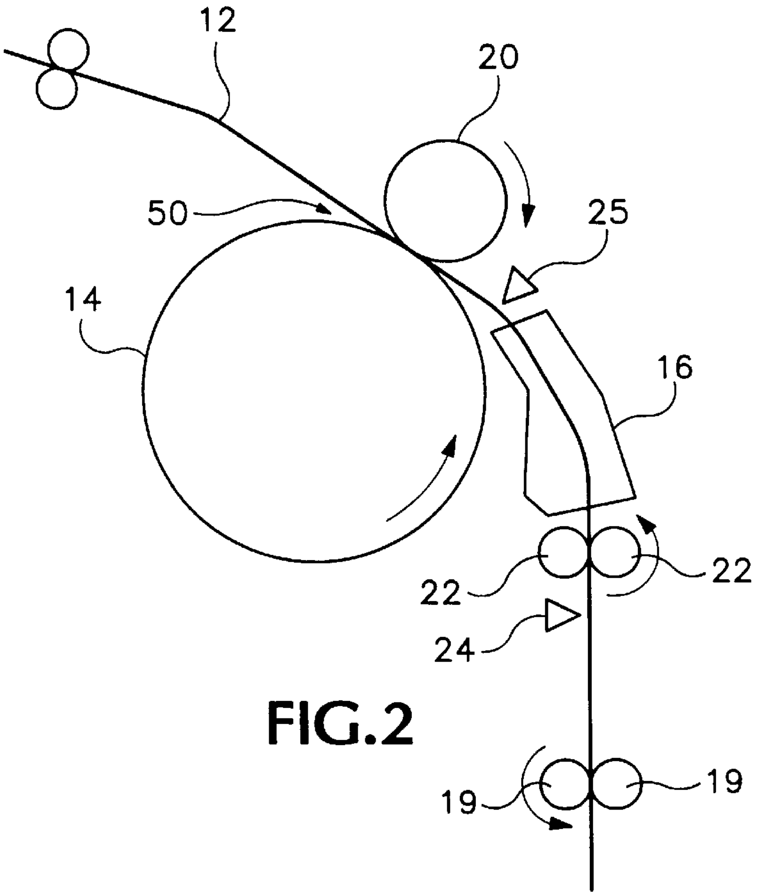
FIG. 2 is a schematic illustration of a portion of the paper path of the transfer ink-jet printer of FIG. 1.

With reference now to FIGS. 1 and 2, the printer 10 utilizes a transfer printing process to place a plurality of pixels in imagewise fashion on a final receiving substrate. More specifically, an ink image is transferred from an intermediate transfer surface (not shown) to a final receiving substrate 12 (hereinafter media), such as paper or a transparency. More specifically, the intermediate transfer surface is first applied to a support surface or drum 14. The support surface may take the form of a drum 14 as shown in FIGS. 2 or alternatively may be a belt, web, platen, or other suitable design. A print head (not shown) then ejects molten or liquid ink onto the intermediate transfer surface to form an ink image thereon.

In the preferred embodiments, the ink utilized in the printer 10 is initially in solid form and is then changed to a molten state by the application of heat energy. The molten ink is then ejected from the print head onto the intermediate transfer surface on the drum 14 to form an ink image thereon. On the intermediate transfer surface/drum 14 the ink cools to an intermediate temperature and solidifies to a malleable state. The media 12 is then fed by a pair of lower feed rollers 19 and upper feed rollers 22 through a preheater 16 and into a nip 50 formed between the drum 14 and a transfer roller 20. As the drum 14 turns, the media 12 is pulled through the nip and is pressed against the deposited ink image, thereby transferring and fixing (transfixing) the ink image to the substrate.

It is important that the media 12 cover the entire image during transfixing so that the transfer roller 20 is not contaminated with ink. It is also a requirement that the printer accurately place the image on the intermediate transfer surface/drum 14 with respect to the edges of the media sheet to achieve the desired margins. To accurately place an image on the media 12, the positions of the print head, media and drum 14 must be carefully coordinated and controlled. To determine the width of the media 12 and the location of the media edges, the printer 10 includes a media measurement subsystem comprising, a media width measurement assembly 24.

Figure 3:
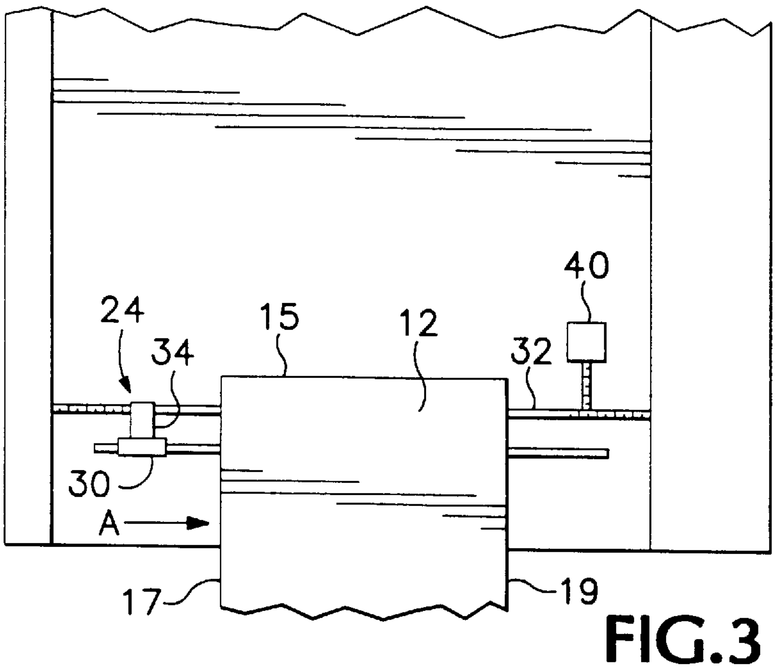
FIG. 3 is a simplified illustration of a media width measurement subsystem comprising a photo-reflective sensor that is traversed access a sheet of media.

As shown in FIG. 2, the media width measurement assembly 24 is located along the paper path just below the upper feed rollers 22. With reference now to FIG. 3, in the preferred embodiment the media width measurement assembly 24 consists of a photo-reflective sensor 30 that is traversed across the width of the media 12 by a lead screw 32 and a carriage 34. An example of a suitable photo-reflective sensor 30 is a Model GP2A20/GP2A22 light modulation, long focal distance type photointerrupter manufactured by the Sharp Corporation. The lead screw 32 is gear driven by a stepper motor 40. The position of the photo-reflective sensor 30 is determined by controlling the step count of the motor 40 and is referenced to a home sensor position.

The media width measurement and edge location process begins with the leading edge 15 of the media 12 staged at the nip of the upper feed rollers 22 (see also FIG. 2). Edge detection is performed uni-directionally by moving the photo-reflective sensor 30 across the media in the direction of action arrow A at a fixed velocity. As the sensor 30 detects the left and right media edges 17, 19, the location of each edge be is recorded. For the purposes of this document, the left media edge location as sensed by the sensor 30 is denoted $L_S$ and the right media edge location as sensed by the sensor 30 is denoted $R_S$.

In an important aspect of the present invention, calibration factors stored in a memory source in the printer 10 are utilized to refine the positions of the edges of the substrate as sensed by the media width measurement assembly 24 and the media length measurement assembly discussed below. The calibration factors are utilized to compensate for inaccuracies and component tolerances in the measurement assemblies, variations in media reflectivities that influence the point of transition of the sensor 30 and other variables that affect the accuracy of the measurement assemblies. A left edge calibration factor $L_{CAL}$ is initially given a nominal value of +0.085 inches (2.16 mm.), and a right edge calibration factor $R_{CAL}$ is initially given a nominal value of –0.085 inches (–2.16 mm.). If the media 12 is a transparency, additional left and right transparency calibration factors $OHP_L$ and $OHP_L$ are utilized. The preferred value for $OHP_R$ is –0.0316 inches (–0.803 mm.) and for $OHP_L$ is +0.0316 inches (0.803 mm.). Both a top calibration factor $TOP_{CAL}$ and a bottom calibration factor $BOT_{CAL}$ are initially given nominal values of 0.

After the media width measurement assembly 24 has scanned the width of the media 12, the calibrated position of the media left edge $P_{LE}$ is calculated by the formula $P_{LE}=L_S+L_{CAL}$, where $L_S$ is the sensed position of the left edge of the substrate as detected by the sensor 30. Similarly, the calibrated position of media right edge $P_{RE}$ is calculated by the formula $P_{RE}=R_S+R_{CAL}$, where $R_S$ is the sensed position of the right edge of the substrate as detected by the sensor 30. If the media 12 is a transparency, then $P_{LE}=L_S+L_{CAL}+OHP_L$, and $P_{RE}=R_S+R_{CAL}+OHP_R$. With the calibrated position of the media right and left edge determined, the width of the media W is calculated by the formula $W=P_{RE}-P_{LE}$.

Figure 4:
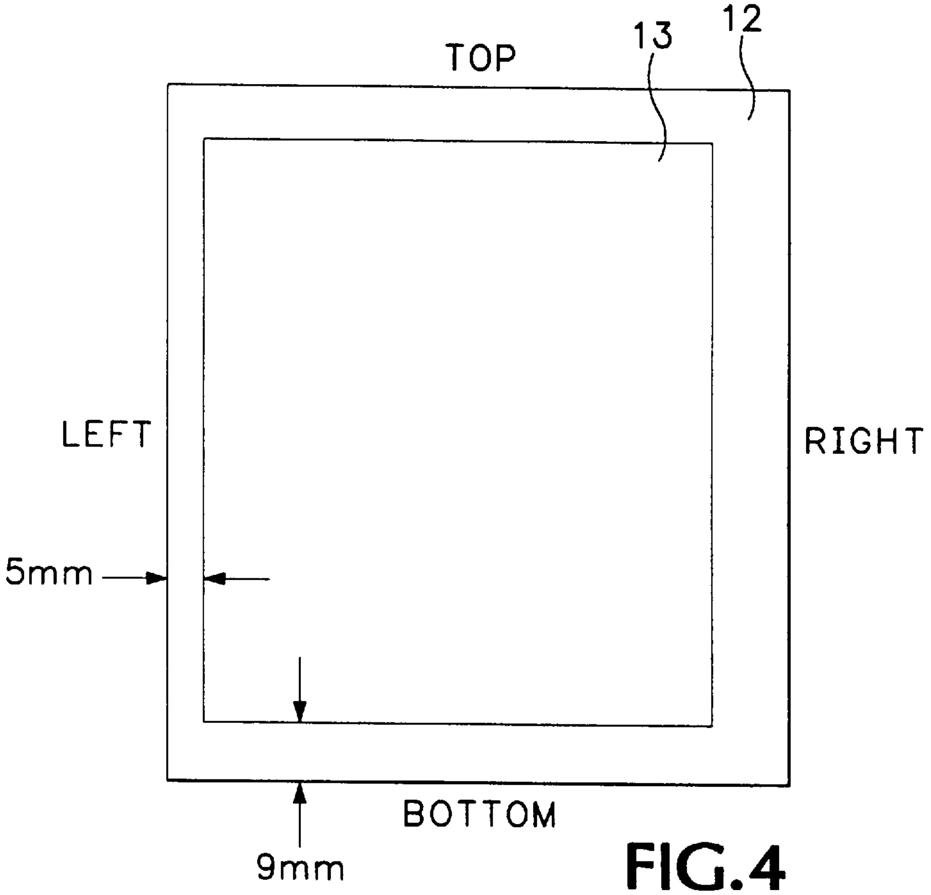
FIG. 4 is an illustration of an image printed on a final receiving substrate showing the left, right, top and bottom margins.

In the preferred embodiment a page description language generates a bit map that represents the image to be printed. The page description language also calculates the width $I_w$ and the length $I_L$ of the bit map/image. With reference now to FIG. 4, a sample image 13 is shown printed on a sheet of media 12. In the preferred embodiment, the sample image 13 is justified to the lower left edges of the media 12. Additionally, the left margin between the left media edge and the left edge of the bit map/image 13 is preferably fixed at 5 mm and the bottom margin between the bottom media edge and the bottom edge of the bit map/image is preferably fixed at 9 mm. Thus, a calculated position of the left edge of the image $I_{LE}$ may be calculated by the equation $I_{LE}=P_{LE}+5$ mm. It follows that a calculated position of the right edge $I_{RE}$ of the image may be found by the equation $I_{RE}=I_{LE}+I_W$.

After the media width measurement process has been completed, the calibrated position of the media right edge $P_{RE}$, the media left edge $P_{LE}$, the image left edge $I_{LE}$ and the image right edge $I_{RE}$ are now known. At this point, the length of the media 12 is assumed. The assumed length is based on job information from the page description language, position information from the media supply tray or previous measurement of media from the tray. With this information, printer firmware can calculate the right and top margins that are not fixed. If the right margin as calculated by the firmware is less than a desired value, preferably five millimeters, the right edge of the image will be clipped. Similarly, if the top margin is less than a desired value, preferably nine millimeters, the top edge of the image may be clipped. With the media and image dimensions known, the bit map image is now placed.

Figure 5:
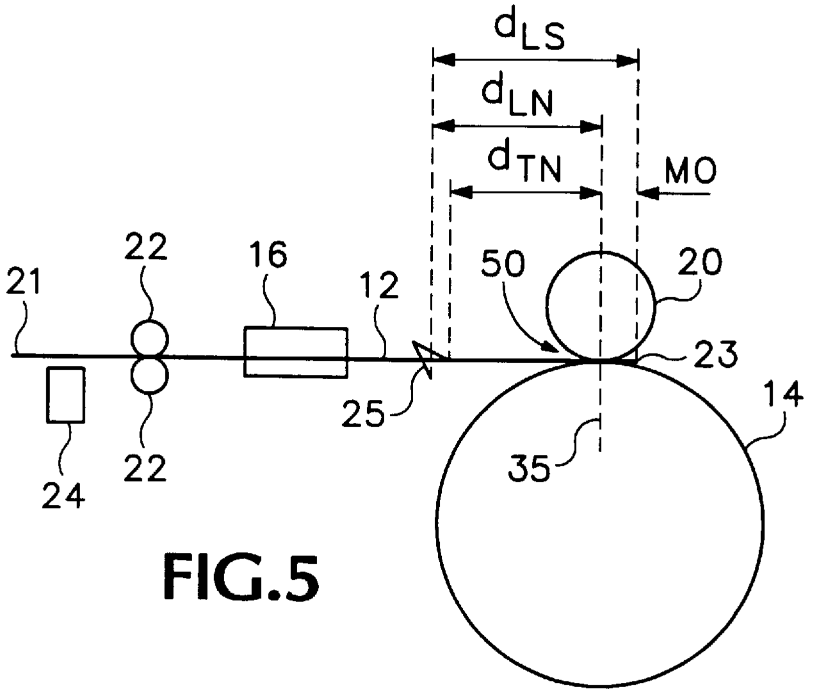
FIG. 5 is a schematic illustration showing a sheet of media being staged within the nip between the transfix roller and the drum, and showing the distances between the leading edge/trailing edge detection at the preheater exit sensor and the nip center line and leading edge as staged for transfixing.
Figure 5A:
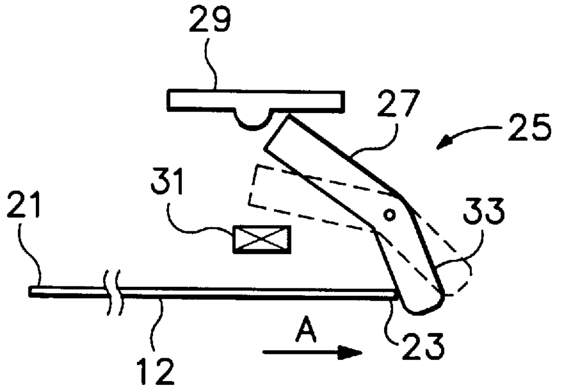
FIG. 5*a* is a schematic illustration of the action of the preheater exit sensor as it is moved by the leading edge of the media.

After width measurement, the media 12 is ready for rendezvous with the drum 14. With reference now to FIG. 5, the media 1 2 is transported from the tipper transport rollers 22 through the preheater 16 until the leading edge 23 of the media is detected by the preheater exit sensor 25. As shown in FIG. 5*a*, the exit sensor 25 preferably comprises a pivoting arm 27, a light emitting transmitter 29 and a receiver 31. The leading edge 23 of the media 12 contacts a bottom portion 33 of the arm 27 and pivots the arm away from a home position to interrupt the path between the transmitter 29 and the receiver 31, as illustrated by the arm in dotted outline. This point of interruption is referred to as a sensor event.

With reference now to FIG. 5, this sensor event is used to determine the distance $d_{LS}$ remaining to transport the media until stopping for transfix loading. The distance $d_{LS}$ is calculated by the equation $d_{LS}=d_{LN}+BOT_{CAL}+MO$, where $d_{LN}$=the distance from the detection of the media leading edge 23 (the sensor event) to the nip center line 35 and MO=the margin offset which is preferably fixed at 3.5 millimeters. The margin offset MO allows a leading portion of the media 12 to be fed into the nip 50 prior to the image being transfixed on the media.

With continued reference to FIGS. 5 and 5*a*, as the media 12 is fed through the nip 50 and the transfix process nears completion, the trailing edge 21 of the media is detected by the preheater exit sensor 25. This detection occurs when the trailing edge 21 passes beyond the bottom portion 33 of the arm 27, thereby allowing the arm to pivot back to its home position and clear the path between the transmitter 29 and the receiver 31. As shown in FIG. 5, at this point the distance $d_{TN}$ from the trailing edge detection to the nip center line 15 is known. With this information, the length of the media $L_M$ can be calculated by the equation $L_M=MO+dT+d_{TN}+TOP_{CAL}$, where dT=the distance of rotation of the drum 14 during transfix from the start of transfix until the trailing edge of the media is detected.

Figure 6:
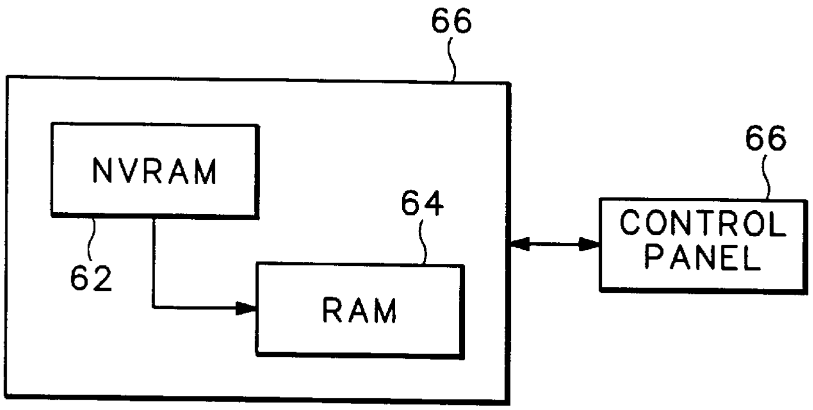
FIG. 6 is a simplified block diagram showing the power control board in the printer, including the NVRAM and RAM memory sources.

The method of the present invention for calibrating a printer will now be described. As explained above, the calibration factors $L_{CAL}$, $R_{CAL}$, $TOP_{CAL}$ and $BOT_{CAL}$ are given nominal values and stored in a memory source in the printer 10. With reference now to FIG. 6, preferably these calibration factors are stored in one or more NVRAM memory sources 62 on a power control board 66 in the printer 10. The values of the calibration factors stored in the NVRAM memory source 62 are written to a RAM memory source 64 upon power-up of the printer 10 and whenever these values are updated by the calibration method of the present invention.

With reference now to FIG. 1, in the preferred embodiment the method begins with an operator initiating the calibration procedure via a control panel 60 on the printer 10. With reference now to FIG. 7, a test image 40 is then printed on a sheet of A-size or A-4 size media 42. The preferred type of media for the test image 40 is a white, smooth paper such as Hammermil Laser Print paper or Northwest Gloss 80 Text paper. As described above, the media width measurement subsystem 24, the media preheater exit sensor 25 and/or information from the page description language are utilized to determine the calibrated media left edge $P_{LE}$, the calibrated media right edge $P_{RE}$ and the media width W.

Figure 7A:
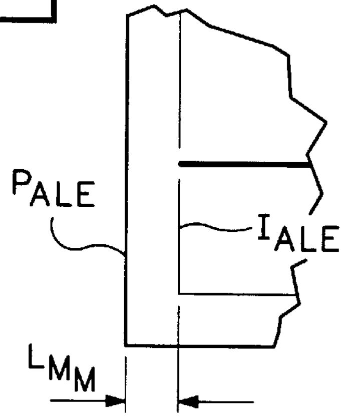
FIG. 7*a* is an enlarged illustration of the lower edges of the test image of FIG. 6 showing the actual media left edge, the actual image left edge and the resulting left margin.
Figure 7:
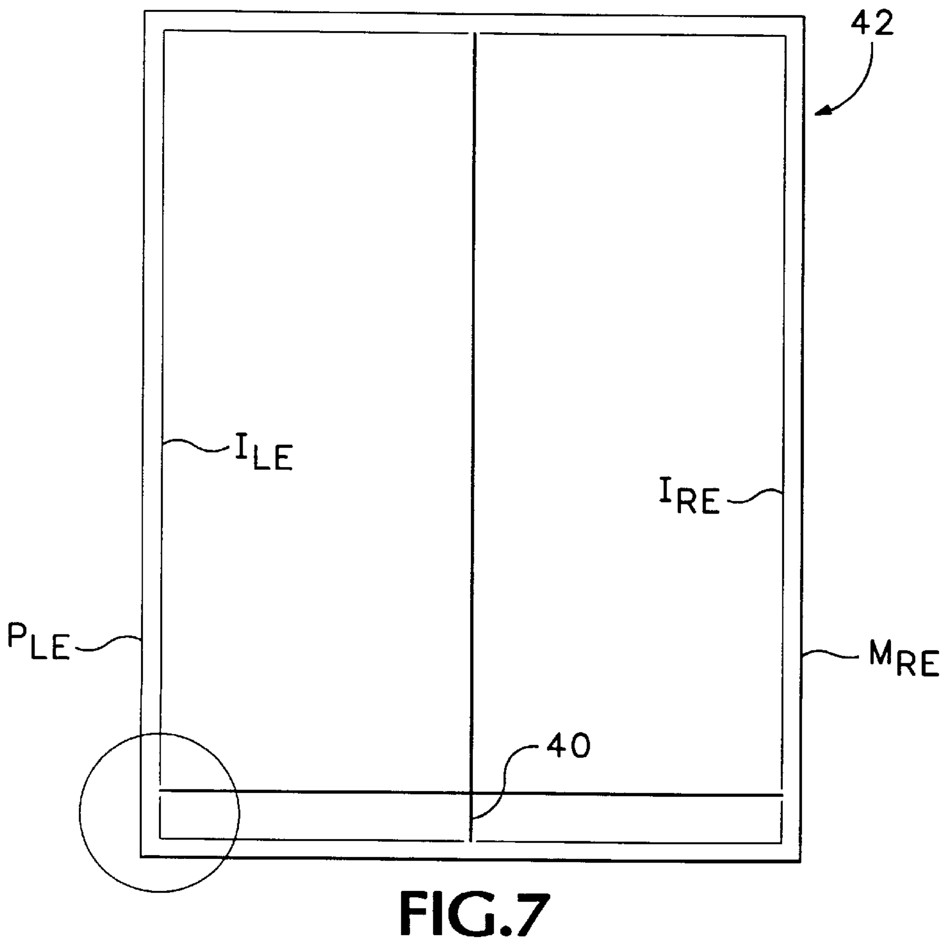
FIG. 7 is an illustration of a test image printed on a final receiving substrate in accordance with the method of the present invention.

After the test image 42 has been printed, an operator measures the left margin $LM_M$ between the actual image left edge $I_{ALE}$ and the actual media left edge $P_{ALE}$ as illustrated in FIG. 7*a*. From the printer-made measurements described above, firmware in the printer 10 calculates and displays via the control panel 60 a calculated left margin $LM_C$ that is defined by the equation $LM_C=I_{LE}-P_{LE}$. The operator then increments or decrements the displayed value $LM_C$, if different from the measured left margin value $LM_M$, until it matches $LM_M$ and enters this value into the printer firmware via the control panel 60. The printer firmware then adjusts the nominal calibration factor $L_{CAL}$ based on this new information to yield an adjusted calibration factor $L_{CAL}'$, where $L_{CAL}'=L_{CAL}+(LM_C-LM_M)$. The adjusted left calibration factor $L_{CAL}'$is then saved to the NVRAM memory source 62 and replaces the previous left calibration factor $L_{CAL}$. The values in the NVRAM memory source 62 are copied to the RAM memory source 64 and the printer 10 operates using the RAM values.

A similar procedure of measuring the right, top and bottom margins and calibrating the right, top and bottom calibration factors $R_{CAL}$, $TOP_{CAL}$ and $BOT_{CAL}$ respectively, is then carried out by the operator. With regard to the right margin, the calculated right margin value $RM_C$ displayed via the control panel 60 is defined by the equation $RM_C=P_{RE}-I_{RE}$. The adjusted right calibration factor $R_{CAL}'$is defined by the equation $R_{CAL}'=(LM_M+I_W+RM_M)+(L_S+L_{CAL}'-R_S)$. With regard to the bottom margin, the calculated bottom margin value $BM_C$ displayed on the control panel 60 is a fixed value, preferably 9 mm. The adjusted bottom calibration factor $BOT_{CAL}'$is determined by incorporating the measured bottom margin $BM_M$ into the equation $BOT_{CAL}'=(BM_C-BM_M)+BOT_{CAL}$. With regard to the top margin, the calculated top margin value $TM_C$ displayed on the control panel 60 is determined by the equation $TM_C=L_M-I_L-BM_C$. The adjusted top calibration factor $TOP_{CAL}'$ is determined by incorporating the measured top margin $TM_M$ into the equation $TOP_{CAL}'=(TM_M-TM_C)+TOP_{CAL}$.

Once the calibration process is complete, subsequent printing is performed by utilizing the adjusted calibration factors $L_{CAL}'$, $R_{CAL}'$, $BOT_{CAL}'$, and $TOP_{CAL}'$ to locate the media left edge $P_{LE}$, the media right edge $P_{RE}$, the media width W, the media length $L_M$ and the distance $d_{LS}$ remaining in the transfix process. With these adjusted calibration factors, the printer 10 more accurately determines media position relative to the print head, can place an image on the drum 14 to achieve the desired margins and can determine whether or not the image requires clipping to prevent the image from extending past the boundaries of the media.

The foregoing description of a preferred embodiment of the invention has been presented for purposes of illustration and description. It is not intended to be exhaustive or to limit the invention to the precise form disclosed. The terms and expressions which have been employed in the foregoing specification are used therein as terms of description and not of limitation. The use of such terms and expressions is not intended to exclude equivalents of the features and steps shown and described or portions thereof. Many changes, modifications, and variations in the materials, arrangement of parts and steps can be made, and the invention may be utilized with various different printing apparatus, all without departing from the inventive concepts disclosed herein.

The preferred embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally, and equitably entitled. All patents cited herein are incorporated by reference in their entirety.

What is claimed is:

1. In a printer for printing an image by placing a plurality of pixels in imagewise fashion on a final receiving substrate, a method for calibrating placement of the image on the final receiving substrate, the method comprising the steps of:

a. storing in a memory source in the printer at least one nominal calibration factor for aligning the image on the final receiving substrate;

b. printing a test image on the final receiving substrate;

c. determining a sensed position of at least one edge of the final receiving substrate;

d. measuring a measured margin between an edge of the test image and the edge of the final receiving substrate;

e. adjusting the nominal calibration factor based on the measured margin to yield an adjusted calibration factor; and f. utilizing the adjusted calibration factor to align the image on the final receiving substrate.

2. The method of claim 1, wherein step f comprises adding the adjusted calibration factor to the sensed position of the edge of the final receiving substrate to calculate a calibrated position of the edge of the final receiving substrate.

3. The method of claim 2, wherein the calibrated position of the edge of the final receiving substrate is a calibrated position $P_{LE}$ of a left edge of the final receiving substrate, and the method further includes the step of calculating a calculated left margin $LM_C$ between a calculated left edge of the test image $I_{LE}$ and the calibrated position $P_{LE}$ of the left edge of the final receiving substrate by utilizing an equation $LM_C=I_{LE}-P_{LE}$.

4. The method of claim 3, wherein the nominal calibration factor is a nominal left calibration factor $L_{CAL}$, the sensed position is a sensed position $L_S$ of a left edge of the final receiving substrate, the measured margin is a measured left margin $LM_M$ between an actual left edge of the test image and an actual left edge of the final receiving substrate, the adjusted calibration factor is an adjusted left calibration factor $L_{CAL}'$, and wherein step e comprises calculating the adjusted left calibration factor $L_{CAL}'$ by utilizing an equation $L_{CAL}'=L_{CAL}+(LM_C-LM_M)$.

5. The method of claim 4, wherein the calibrated position of the edge of the final receiving substrate is a calibrated position $P_{RE}$ of a right edge of the final receiving substrate, and the method further includes the step of calculating a calculated right margin $RM_C$ between a calculated right edge of the test image $I_{RE}$ and the calibrated position $P_{RE}$ of the right edge of the final receiving substrate by utilizing an equation $RM_C=P_{RE}-I_{RE}$.

6. The method of claim 5, wherein the nominal calibration factor is a nominal right calibration factor $R_{CAL}$, the sensed position is a sensed position $R_S$ of a right edge of the final receiving substrate, the measured margin is a measured right margin $RM_M$ between an actual right edge of the test image and the right edge of the final receiving substrate, the adjusted calibration factor is an adjusted right calibration factor $R_{CAL}'$, and wherein step e comprises calculating the adjusted right calibration factor $R_{CAL}'$ by utilizing an equation $R_{CAL}'=(LM_M+I_W+RM_M)+(L_S+L_{CAL}'-R_S)$, where $I_W$=a width of the test image.

7. The method of claim 6, further including the step of calculating the width $I_W$ of the test image by utilizing a page description language.

8. The method of claim 4, wherein the nominal left calibration factor $L_{CAL}$=+0.085 inches.

9. The method of claim 6, wherein the nominal right calibration factor $R_{CAL}$=−0.085 inches.

10. The method of claim 1, wherein the final receiving substrate is paper based.

11. The method of claim 4, wherein the final receiving substrate is a transparency, and wherein the calibrated position $P_{LE}$ of the left edge of the final receiving substrate is calculated by utilizing an equation $P_{LE}=L_S+L_{CAL}'+OHP_L$, where $OHP_L$ is a left transparency factor.

12. The method of claim 11, wherein $OHP_L$=−0.0316 inches.

13. The method of claim 6, wherein the final receiving substrate is a transparency, and wherein the calibrated position $P_{RE}$ of the right edge of the final receiving substrate is calculated by utilizing an equation $P_{RE}=R_S+R_{CAL}'+OHP_R$, where $OHP_R$ is a right transparency factor.

14. The method of claim 13, wherein $OHP_R$=+0.0316 inches.

15. The method of claim 1 wherein the printer is an ink-jet printer.

16. The method of claim 15, wherein the printer jets ink directly onto the final receiving substrate.

17. The method of claim 15, wherein the ink-jet printer first creates the image on an intermediate transfer surface and then transfers the image to the final receiving substrate.

18. The method of claim 17, wherein the ink-jet printer utilizes solid ink that is melted and jetted onto the intermediate transfer surface.

19. In a printer for printing an image by placing a plurality of pixels in imagewise fashion on a final receiving substrate, a method for calibrating placement of the image on the final receiving, substrate, the method comprising the steps of:

a. storing in a memory source in the printer at least one nominal calibration factor for aligning the image on the final receiving substrates;

b. printing a test image on the final receiving substrate;

c. determining a sensed position of at least one edge of the final receiving substrate;

d. measuring a measured margin between an edge of the test image and the edge of the final receiving substrate;

e. adjusting the nominal calibration factor based on the measured margin to yield an adjusted calibration factor; and f. utilizing the adjusted calibration factor to determine a length $L_M$ of the final receiving substrate.

20. The method of claim 19, wherein step f is performed by utilizing the equation $L_M=MO+dT+d_{TN}+TOP_{CAL}$, where MO=a margin offset, dT=a distance of transfix, $d_{TN}$=a distance from a trailing edge of the final receiving substrate to a nip and $TOP_{CAL}$=a top calibration factor.

* * * * *